United States Patent [19]
Norton

[11] Patent Number: 5,381,869
[45] Date of Patent: Jan. 17, 1995

[54] SERVO STEERING SYSTEM WITH STEPPING MOTOR

[76] Inventor: Peter Norton, 2730 Narraganset, Lansing, Mich. 48910

[21] Appl. No.: 114,298

[22] Filed: Aug. 30, 1993

Related U.S. Application Data

[63] Continuation of Ser. No. 961,064, Oct. 14, 1992, abandoned, which is a continuation of Ser. No. 793,217, Nov. 7, 1991, abandoned, which is a continuation of Ser. No. 439,019, Nov. 20, 1989, abandoned, which is a continuation of Ser. No. 300,723, Jan. 23, 1989, abandoned, which is a continuation of Ser. No. 233,939, Aug. 17, 1988, abandoned, which is a continuation of Ser. No. 843,113, Mar. 24, 1986, abandoned, which is a continuation-in-part of Ser. No. 623,203, Jun. 21, 1984, Pat. No. 4,577,716.

[51] Int. Cl.⁶ .............................................. B62D 5/04
[52] U.S. Cl. .................... 180/79.1; 192/43.1; 192/46; 192/71
[58] Field of Search ............. 180/79.1; 192/43.1, 192/43.2, 46, 71

[56] References Cited

U.S. PATENT DOCUMENTS

| | | | |
|---|---|---|---|
| 4,437,531 | 3/1984 | Urabe | 180/79.1 |
| 4,448,275 | 5/1984 | Kitagawa et al. | 180/79.1 |
| 4,458,795 | 7/1984 | Norton | 180/79.1 X |
| 4,471,280 | 9/1984 | Stack | 180/79.1 X |
| 4,509,611 | 4/1985 | Kade et al. | 180/79.1 |
| 4,530,413 | 7/1985 | Buike et al. | 180/79.1 |
| 4,548,091 | 10/1985 | Norton | 74/388 PS X |
| 4,574,928 | 3/1986 | Norton | 192/48.92 |
| 4,577,716 | 3/1986 | Norton | 180/79.1 |
| 4,582,155 | 4/1986 | Ohe | 180/79.1 |
| 4,588,060 | 5/1986 | Norton | 180/79.1 X |
| 4,598,787 | 7/1986 | Drutchas | 180/79.1 |
| 4,624,334 | 11/1986 | Kelledes et al. | 180/79.1 |
| 4,650,019 | 3/1987 | Yanai et al. | 180/79.1 |
| 4,676,331 | 6/1987 | Iwaki et al. | 180/79.1 |

FOREIGN PATENT DOCUMENTS 2164906  4/1986  United Kingdom ............ 180/79.1

Primary Examiner—Mitchell J. Hill
Attorney, Agent, or Firm—Reising, Ethington, Barnard, Perry & Milton

[57] ABSTRACT

A power steering system for vehicles is disclosed using a stepping motor. The stepping motor is energized for power assist in executing turns and for reducing drag of the servomotor during the return of the dirigible wheels to the straight ahead position. A torque transducer operatively coupled with the steering wheel shaft and the steering gear generates a torque signal corresponding to the torque applied by the driver to the steering wheel. A resilient coupling also providing a range of unresisted lost motion is provided between the stepping motor and the steering gear and a transducer is operatively coupled therewith to develop a signal corresponding to lost motion. The torque signal and the lost motion signal are combined differentially and the resultant signal is used to control stepping of the stepping motor. When the driver applies torque to the steering wheel, the torque signal indicates driver input torque and the lost motion signal indicates the applied servo torque. Torque at the steering wheel which the driver senses indicates torque exerted by the stepping motor. When the driver releases the steering wheel, the torque signal drops to zero and the lost motion signal controls the energization of the stepping motor to overcome its resistance to the return of the dirigible wheels to the straight ahead position.

15 Claims, 5 Drawing Sheets

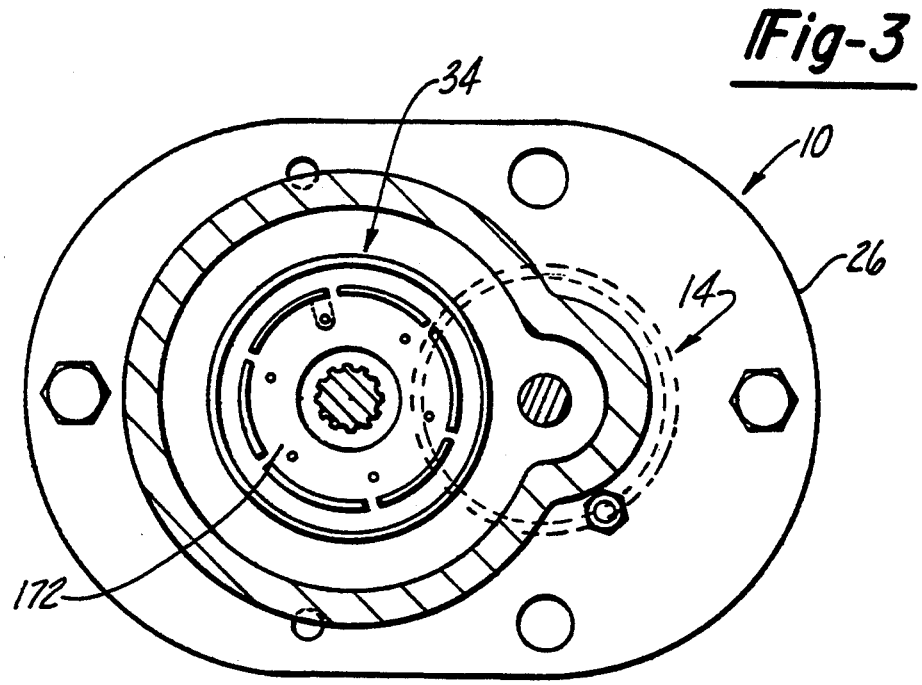
Fig-3
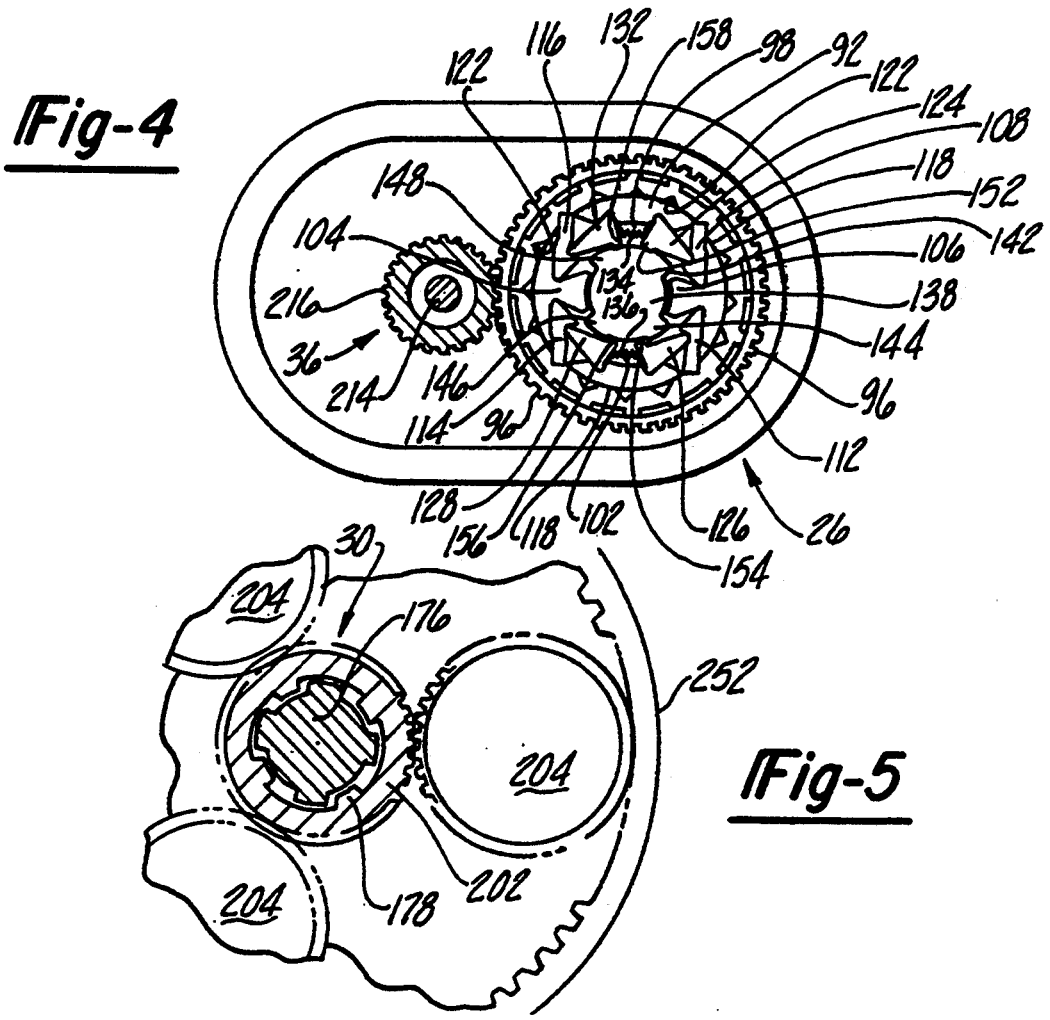
Fig-4
Fig-5

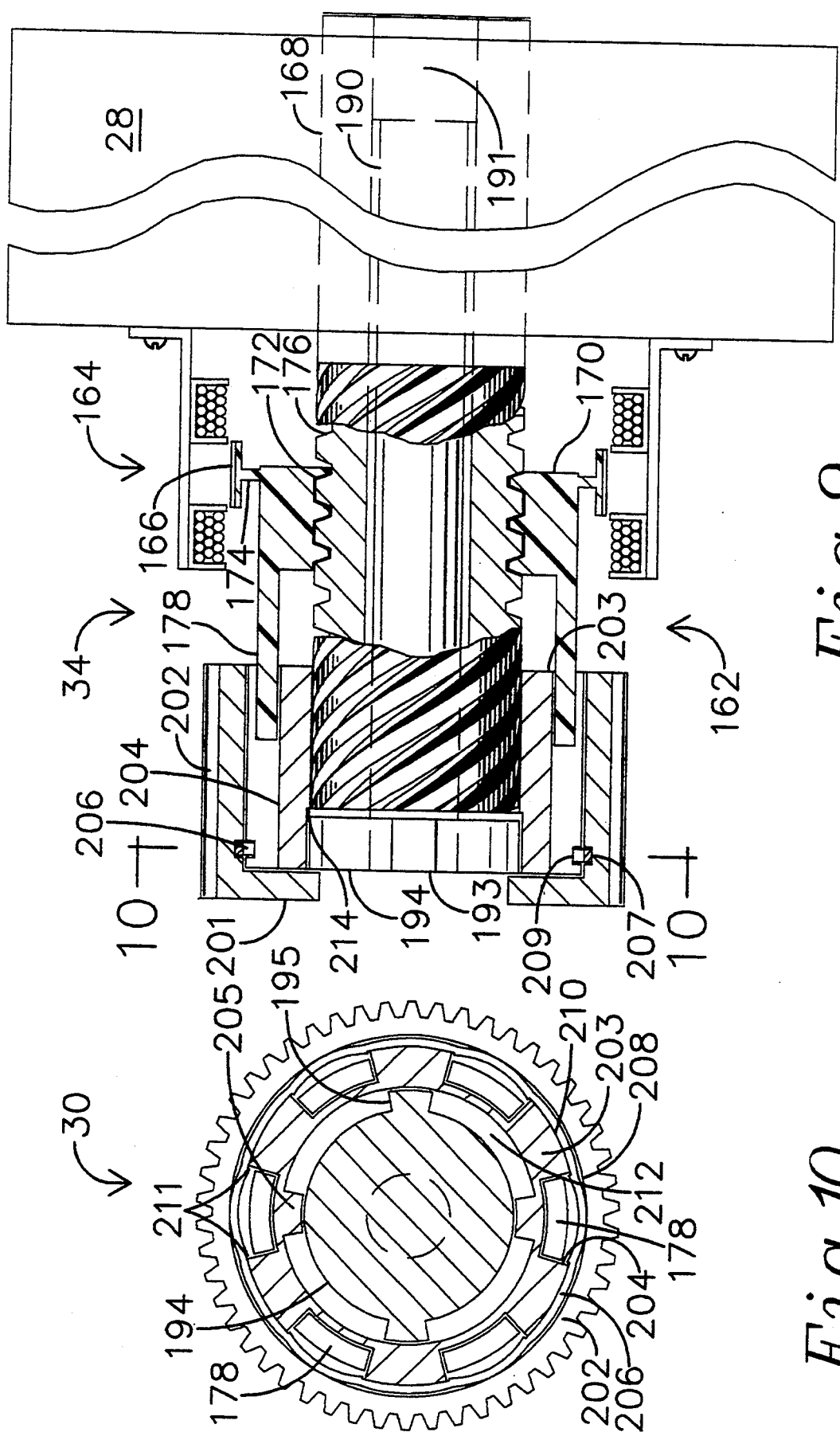

SERVO STEERING SYSTEM WITH STEPPING MOTOR

This is a continuation of application Ser. No. 07/961,064, filed Oct. 14, 1992, now abandoned, which is a continuation of application Ser. No. 07/793,217 filed Nov. 7, 1991, now abandoned, which is a continuation of application Ser. No. 07/439,019 filed Nov. 20, 1989, now abandoned, which is a continuation of application Ser. No. 07/300,723 filed Jan. 23, 1989, now abandoned, which is a continuation of application Ser. No. 07/233,939 filed Aug. 17, 1988, now abandoned, which is a continuation of application Ser. No. 06/843,113 filed Mar. 24, 1986, now abandoned, which is a continuation-in-part of application Ser. No. 06/623,203 filed Jun. 21, 1984, which issued as U.S. Pat. No. 4,577,716.

BACKGROUND OF THE INVENTION

In general, a power steering system for an automotive vehicle comprises a servomotor which is controlled by the steering wheel for turning the dirigible wheels. Hydraulic servomotors are conventionally used and it is also known to utilize an electric servomotor.

In conventional vehicle steering systems, it is desirable for the dirigible wheels of the vehicle to automatically return to the straight ahead position after the driver has executed a turn and releases the steering wheel. In the conventional system, this is realized as the result of the geometry of the steering system. In particular, with the vehicle moving forward and the front wheels turned, the road forces acting on the front wheels tend to turn the front wheels back to the straight ahead position. This restoring force which originates from the reaction of the front wheels with the road surface, is transmitted through the steering linkage to the steering gear. Rotation of the steering gear to the straight ahead position is effective to drive the steering shaft and steering wheel to the straight ahead position. It also tends to drive the servomotor to the straight ahead position. In the case of a hydraulic servomotor the drag forces are compensated by changing the steering geometry to increase the restoring force. If an electric stepping motor is to be used, the resisting force due to inertia and friction in the motor may be substantial in relation to the restoring force. To minimize the cost and weight of the stepping motor it is desirable to use a large gear reduction ratio. This increases the effects of inertia and friction. Without special measures, the resisting force or drag imposed by the electric servomotor has the effect of slowing the return of the front wheels to the straight ahead position and may require the driver to assist in the turning of the front wheels to the straight ahead position.

Using a stepping motor is known in servomotor applications. If a stepping motor is to be used in a steering system, the use of only a driver input torque sensor results in a system with little indication to the driver of the torque being exerted by the stepping motor.

A general object of this invention is to provide a control system for improving indication to the driver of stepping motor effort and for reducing the drag of the stepping motor and gear train on the return of the dirigible wheels to the straight ahead position, to include this capability in a power steering system in a neat and compact structure and to overcome certain disadvantages of the prior art.

SUMMARY OF THE INVENTION

In accordance with this invention, a vehicle power steering system is provided with an electric stepping motor; further, means is provided for reducing drag imposed by the stepping motor in the turning of the dirigible wheels toward the straight ahead direction and for indicating stepping motor effort to the driver. This is accomplished by utilizing a differential control signal for controlling energization of the stepping motor for both power assist in turning and reduction of drag in returning to the straight ahead position.

Further, in accordance with this invention, the stepping motor itself is utilized for the reduction of drag imposed by the stepping motor. This is accomplished by producing a control signal in response to rotational effort being applied from the dirigible wheels to the stepping motor and energizing the stepping motor in accordance with the control signal. More particularly, the stepping motor is coupled to the steering gear through a lost motion coupling and a signal generating means is provided for generating a lost motion signal in response to the lost motion travel in the coupling. This coupling has a central region of unresisted lost motion. Outside this central region a resilient means resists lost motion with torque proportional to the lost motion. Control means responsive to the lost motion signal controls the energization of the stepping motor whereby it is energized to reduce its resistance to the turning of the dirigible wheels toward the straight ahead direction when there is no manual turning effort applied by the driver to the steering wheel. Further, according to this invention, the control means is adapted to control the energization of the stepping motor in accordance with a signal corresponding to a differential combination of a torque signal indicating the torque transmitted by the steering wheel and a lost motion signal indicating lost motion in a coupling between the stepping motor and the pinion gear; the stepping motor is energized to the extent required to overcome frictional losses when the torque signal is near zero. More particularly, the control means comprises means for differentially combining the torque signal and the lost motion signal for developing a signal for controlling the energization of the stepping motor. Further, in accordance with this invention, an angular motion to linear motion converter is provided for generating a lost motion signal. Further, in accordance with this invention, the motion converter used for generating the lost motion signal has a resilient member for resisting lost motion and a central position about which lost motion is not resisted by the resilient member.

A more complete understanding of this invention may be obtained from the detailed description that follows taken with the accompanying drawings.

DESCRIPTION OF THE DRAWINGS

FIG. 3 is a view taken on lines 3—3 of FIG. 2;

FIG. 4 is a view taken on lines 4—4 of FIG. 2;

FIG. 5 is a view taken on lines 5—5 of FIG. 2;

FIG. 9 is a view in cross-section of a motion converter and linear position sensor; and FIG. 10 is a view taken along lines 10—10 of FIG. 9.

BEST MODE FOR CARRYING OUT THE INVENTION

Figure 1:
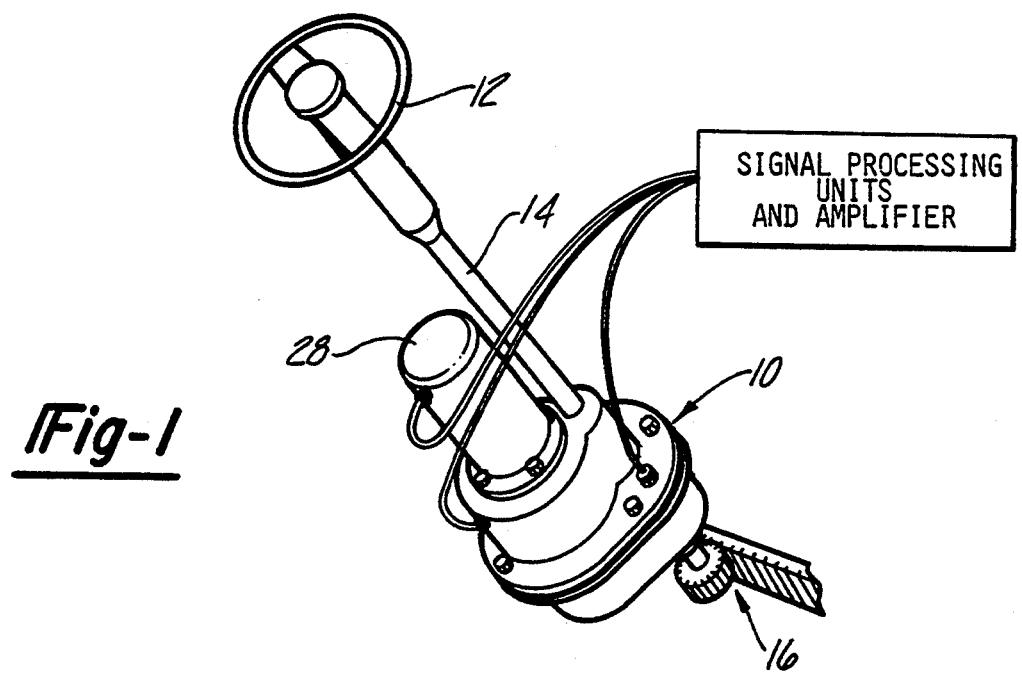
FIG. 1 is a perspective view of one embodiment of this invention in a power steering system for a vehicle.

Referring now to the drawings, the invention is shown in an illustrative embodiments in a power steering unit for a vehicle. It will be appreciated, as the description proceeds, that the invention may be embodied in other designs and used in other applications.

FIG. 1 of the drawings shows the power steering unit 10 of this invention installed in a typical automotive steering system. In general, the steering system comprises a steering wheel 12 which is connected through an upper steering shaft 14 to a steering gear 16. The steering gear 16 is operatively connected with the dirigible wheels of the vehicle for displacing the wheels in accordance with the rotative position of the steering wheel 12. The power steering unit 10 is interposed between the steering shaft 14 and the steering gear 16. The power steering unit 10 is provided with a servo system drive connection with the steering gear 16 and, for fail-safe purposes, it is also provided with a manual drive connection with the steering gear 16.

The power steering unit 10 will now be described in detail with reference to FIGS. 2, 3, 4 and 5. The upper steering shaft 14 and a lower steering shaft 22 are connected together by a drive transmitting, fail-safe coupling 26. The coupling includes a lost motion coupling 30 which provides an unyielding coupling between the shafts 14 and 22. The shaft 14 constitutes a manually actuated control member for the fail-safe drive transmitting coupling 26. The coupling 26 is adapted under certain circumstances to transmit torque from the upper steering shaft 14 to the lower steering shaft 22. It is also adapted, under certain circumstances, to transmit torque from a stepping motor 28 to the lower steering shaft 22. The drive transmitting coupling 26 will be described in more detail subsequently. A torque transducer 32 is operatively associated with the upper shaft 14 and lower shaft 22 and is adapted to develop an electric signal corresponding to the relative angular displacement therebetween and hence the turning effort or torque applied to the steering wheel 12 by the driver. The torque transducer 32 will be described in greater detail subsequently.

The stepping motor 28, which is a reversible stepping motor, is connected through a lost motion coupling 30 and a gear set 36 to the drive transmitting coupling 26 and thence to the steering gear 16. A lost motion transducer 34 is operatively associated with the lost motion coupling 30 and generates a signal corresponding to lost motion which also corresponds to stepping motor shaft torque at higher torques.

Figure 7:
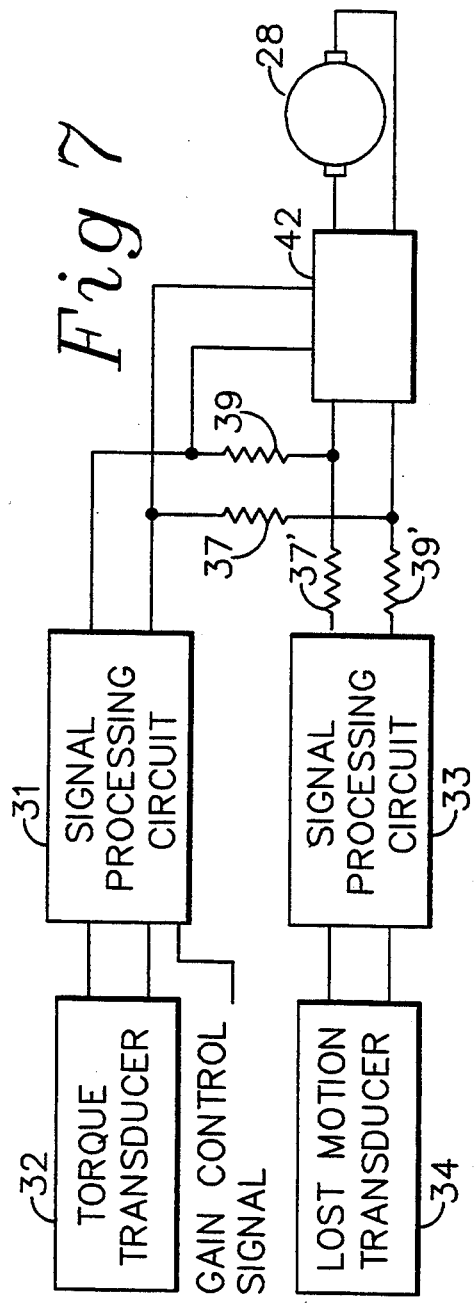
FIG. 7 is a block diagram of the servo system.

The servo system is shown in block diagram in FIG. 7. It comprises, in general, the torque transducer 32, lost motion transducer 34, a stepping motor control circuit 42 and the stepping motor 28. The torque transducer 32 is coupled to a signal processing circuit 31 which develops a torque signal which is applied to the primary input of stepping motor control circuit 42 through resistors 37 and 39. Similarly, the lost motion transducer 34 is coupled to a signal processing circuit 33 which develops a lost motion signal which is applied to the primary input of stepping motor control circuit 42 through resistors 37' and 39'. The servo system will be described in greater detail subsequently; for present purposes, suffice it to say that the torque signal and lost motion signals are combined differentially and applied to the input of the stepping motor control circuit 42 which controls the energization of the stepping motor 28. The stepping motor 28 operates through the lost motion coupling 30, the gear set 36 and the drive transmitting coupling 26 to actuate the steering gear 16 in accordance with the driver applied torque. In accordance with this invention, the lost motion transducer 34 generates a signal corresponding to the lost motion in the coupling 30. The lost motion signal is combined with the torque signal for developing a signal at the input of the stepping motor control circuit 42. As a result, the stepping motor is energized to reduce its resistance to the turning of the dirigible wheels toward the straight ahead direction when the torque signal is near zero and the driver is given "feel" for the torque being exerted by the stepping motor.

Figure 6:
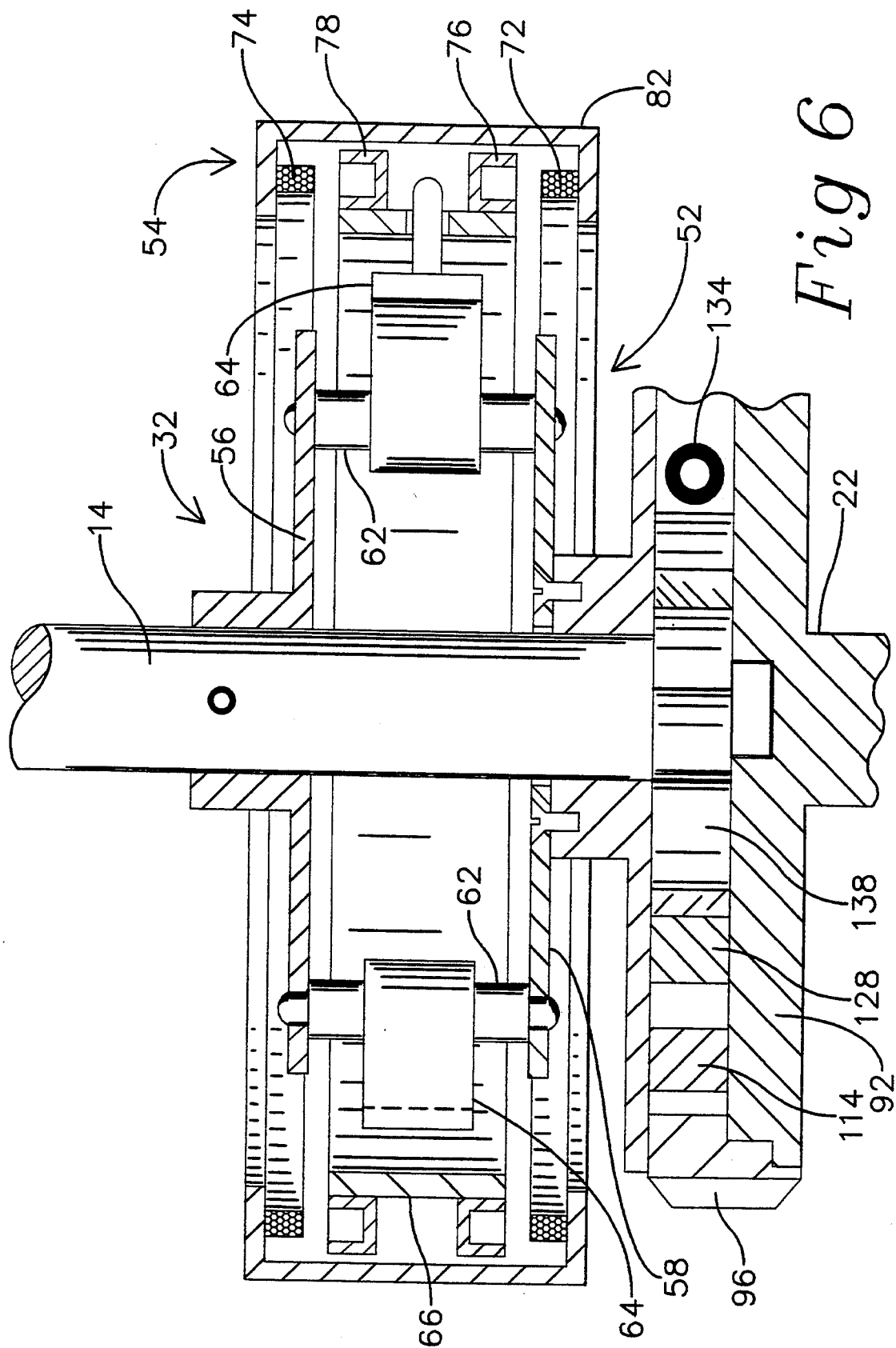
FIG. 6 shows a torque transducer for sensing driver input torque.

Before proceeding with a more detailed description of the power steering unit 10, it will be helpful to consider the torque transducer 32 as shown in FIG. 6. This transducer includes a motion converter of the type which is described and claimed in U.S. Pat. No. 4,548,091 issued on Oct. 22, 1985, by the same inventor as this application. The torque transducer 32 comprises, in general, a motion converter 52 and a linear displacement sensor 54. The motion converter 52 has an input member 56 which is connected with the upper shaft 14 for rotation therewith. It also comprises an input member 58 which is operatively connected with the lower shaft 22 for rotation therewith. There is a certain amount of torsional elasticity in the motion converter so the relative rotation of the upper and lower shafts corresponds to the torque applied to the steering wheel by the driver. (Alternatively, a motion converter or other angular displacement sensor of small torsional stiffness may be used and a torsionally elastic shaft with the desired stiffness may be connected between the upper and lower shafts 14 and 22 ).The input members 56 and 58 are coupled together by a set of links 62 which extend in an axial direction between the input members. Each link is provided with an amplifying arm 64 extending transversely of the link. An output member in the form of a carrier ring 66 is mounted on the free ends of the amplifying arms for movement therewith. In operation of the motion converter 52, the links 62, arms 64 and ring 66 are positioned as shown in FIG. 6 with the input members 56 and 58 in a reference position, i.e. no relative angular displacement. If a clockwise torque is applied to the steering wheel 12 the input member 56 will be rotated in a clockwise direction relative to the input member 58. This will cause the links 62 to be inclined relative to the input member by reason of the flexure of the joints of the links with the input member. Accordingly, the amplifying arms 64 will be deflected upwardly by reason of the movement of the respective links. The arms 64 will be deflected in unison and the carrier ring 66 will be moved linearly along the axis of the angular displacement. If, on the other hand, a counterclockwise torque is applied to the steering wheel 12 the input member 56 will be rotated in a counterclockwise direction relative to the input member 58. This will cause the links 62 to be inclined in the other direction and the amplifying arms 64, and hence the carrier ring 66, will be deflected downwardly.

The linear displacement sensor 54 is of the variable inductance type and comprises a pair of coils 72 and 74. The inductance of the first coil 72 is influenced by a core member 76 of annular configuration which is mounted on the carrier ring 66 for movement therewith. The inductance of the second coil 74 is influenced by an annular core member 78 which is also mounted on the carrier ring 66 for movement therewith. The coils 72 and 74 are mounted on a coil support member 82 which is stationary. The inductance of each of the coils 72 and 74 varies with the proximity of the core members 76 and 78, respectively, and hence in accordance with the relative angular displacement of the upper shaft 18 and the lower shaft 22. The torque transducer 31 is coupled with the signal processing circuit 33 which is responsive to the inductance variation of the coils 72 and 74 to produce a signal voltage corresponding to the driver applied torque.

The drive transmitting coupling 26 will now be described in greater detail with reference to FIGS. 4 and 6. This drive transmitting coupling is suitably of the type described and claimed in U.S. Pat. No. 4,574,928 issued on Mar. 11, 1986, by the same inventor as this application. The drive transmitting coupling 26 comprises, in general, a coupling block 92 which is connected through a shaft 22 with the steering gear 16. A ring gear 96 is rotatably mounted on the peripheral surface of the coupling block 92 and is driven by the output of the gear set 35 which is connected to the servomotor 28. The coupling block 92 is an annular member and includes two opposing compartments 98 and 102 which are separated by internal diametrically opposed abutments or stop flanges 104 and 106. A set of elongated pawls 108, 112, 114 and 116 are rotatably fitted within the compartment to pivot in respective seating pockets formed in the stop flanges 104 and 106. The outer end of each pawl is formed with a flat end to engage teeth 118 to fit into triangular notches 122 which are formed between the teeth on the inside surface of the ring gear 96. Each tooth 118 is symmetrical about a radius line of the ring gear and the notches are equally spaced along the surface of the gear so that the pawls engage whichever notches are adjacent to them at any particular time. The pawls operate as unidirectional connectors, i.e. pawls 108 and 114 positively lock the coupling block 92 and the ring gear 96 together for rotation in one direction but release, in a ratchet-like action, in the event of opposite relative rotation of the gear upon the coupling block. Conversely, the pawls 112 and 116 lock the ring gear 96 to the coupling block 92 for rotation in the other direction with ratcheting when the rotation is reversed. Consequently, by retracting pawls 108 and 114, or alternatively by retracting pawls 112 and 116, the ring gear 96 will be locked to the coupling block 92 for drive in one direction but will slip if the drive direction is reversed.

The pawls 108, 112, 114 and 116 are actuated by intermediate actuators 124, 126, 128 and 132, respectively. The intermediate actuators are generally triangular in configuration and each has a rounded corner in pivotal engagement with a seating pocket in the coupling block 92. Another rounded corner of each actuator is pivotally engaged with a corresponding pawl in a seating pocket thereof. A spring 134 acts between the actuators 124 and 132 and urges them apart thereby urging the respective pawls into engagement with the triangular notches in the ring gear 96. Similarly, a spring 136 urges the actuators 126 and 128 apart and the pawls 112 and 114 are thereby urged outwardly to engage notches in the ring gear 96. Thus, the pawls 108, 112, 114 and 116 are normally extended outwardly into locking positions.

As shown in FIG. 6, the upper shaft 14 terminates in a central actuator 138 which is located within the coupling block 92. The central actuator 138 fits into a central recessed portion located between the stop flanges 104 and 106. The central actuator 138 is provided with teeth 142, 144, 146 and 148 which are adapted to engage tabs 152, 154, 156 and 158, respectively, on the intermediate actuators 124, 126, 128 and 132. Consequently, rotation of the shaft 14 relative to the coupling block in one direction causes the teeth 144 and 148 to engage the tabs 154 and 158 respectively thereby rotating the respective actuators 126 and 132 causing the respective pawls 112 and 116 to rotate out of their engaged position with the teeth of the ring gear 96. Rotation of the shaft 14 in the other direction causes the teeth 142 and 146 to engage the tabs 152 and 156, respectively, thereby rotating the respective actuators 124 and 128 to cause the pawls 108 and 114 to rotate out of their engaged positions with the ring gear 96.

The operation of the drive transmitting coupling 26 is as follows. With the parts of the drive transmitting coupling 26 in the positions as shown in FIG. 4, the pawls 108, 112, 114 and 116 are seated in the triangular notches 122 in the ring gear 96 and thereby lock the ring gear to the coupling block 92 for rotation in either a clockwise or counter clockwise direction. In normal operation, the driver turns the steering wheel 12 in either direction and the angular displacement sensor generates a corresponding torque signal which is applied to the stepping motor control circuit 42 which energizes the stepping motor 28. The stepping motor transmits power through the gear set 36 to the ring gear 96 to rotate it in synchronism with the rotation of the shaft 14 by the steering wheel 12. Thus, the coupling block 92 drives the steering gear 16 for steering the vehicle in accordance with the movement of the steering wheel 12. In the event of a power failure or malfunction, the torque transmitting coupling 26 is operative to provide fail-safe direct manual drive for the steering gear 16 and also to disengage any power drive which might be applied in a direction opposite to the desired turning direction. In case of a partial loss of electrical power, rotation of the steering wheel 12 in a clockwise direction causes the central actuator 138 to rotate clockwise, as viewed in FIG. 4, until the teeth 144 and 148 engage the tabs 154 and 158 to thereby rotate the intermediate actuators 126 and 132 respectively, causing the pawls 112 and 116 to disengage from the teeth in the ring gear 96. The pawls 108 and 114 remain engaged with the ring gear 96 for coupling block coupling block 92 for power assistance in the clockwise turning direction; however, power assist cannot be applied through the ring gear 96 in the opposite direction since pawls 112 and 116 are disengaged and the pawls 108 and 114 would ratchet over the teeth of the ring gear. Further, the rotation of the central actuator 138 causes the teeth 142 and 146 thereon to engage the stop flanges 106 and 104 respectively. This provides a direct drive connection between the shaft 14 and the coupling block 92 for applying direct manual drive torque from the steering wheel to the steering gear 16. Thus, there is a lost motion connection between the central actuator 138 and the coupling block 92. To the extent that the power assist system is able to produce torque even though at a level insufficient to maintain synchronism, that torque, if applied in the direction of the desired rotation, will assist the turning of the coupling block 92. Conversely, if there is torque applied in the opposing direction, such as due to malfunctioning of the stepping motor, then that torque causes idling rotation of the ring gear 96 on the coupling block 92 without transmission of torque. Thus, wrongly directed torque does not oppose or interfere with the direct rotational effort of the direct drive of the steering wheel through the central actuator 138 to the coupling block 92. The operation of the drive transmitting coupling 26 has been described with reference to turning of the steering wheel in the clockwise direction; it will now be appreciated that the coupling operates in an analogous manner when the steering wheel is turned in the counter clockwise direction.

It will now be helpful to consider the structure and operation of the lost motion transducer 34. The motion converter 162 is a lead-screw device and includes the motor shaft 168 with spiral grooves or threads 176 (first threads) output member 170 and sun gear hub 203 with channels 204. Output member 170 has spiral threads 172 (second threads) on its inner diameter to engage grooves 176 on the motor shaft, a carrier portion 174 to carry the rotating element 166 of the axial position sensor 164, and cage bars 178 to mesh with and reside in the channels 204 of sun gear hub 203 for engaging the sun gear hub for rotation therewith. The sun gear hub 203 fits on motor shaft 168 for free movement thereon. It is restrained axially and rotational by a resilient element in the form of a torsion shaft 190 which is positioned coaxially along the center of motor shaft 168. End 191 of torsion shaft 190 is fixedly attached to the motor shaft 168. The remainder of torsion shaft 190 is free to rotate inside motor shaft 168, this rotation being limited by the maximum torsional deformation of torsion shaft 190. End 193 of torsion shaft 190 is fixedly attached to cross member 194 which fits into cavity 212 of sun gear hub 203. Axial movement of sun gear hub 203 and sun gear 202 is prevented by cross member 194. Movement toward the motor is prevented because plate 201 of sun gear 202 contacts cross member 194 which is prevented from moving axially because it is attached to torsion shaft 190 the other end of which is fixedly attached to the motor shaft. Movement away from the motor is prevented because the bottom 214 of cavity 212 of sun gear hub 203 contacts cross member 194 which is prevented from moving axially for reasons previously described. Movement toward the motor is also prevented because cross member 194 would be stopped from moving in that direction by contact with the end of the motor shaft if torsion shaft 190 is sufficiently compressible for that to happen. A certain amount of unresisted or free rotation is allowed between cross member 194 and sun gear hub 203 because cavity 212 is larger than cross member 194 thereby allowing the relative rotation. When the unresisted free movement is exhausted, further rotation of sun gear hub 203 with respect to the motor shaft 168 is resisted by the torsional elasticity of torsion shaft 190. When the motor is exerting a torque this torque is transmitted by torsion shaft 190 to cross member 194 which applies torque to sun gear hub 203. Because the motor torque is being applied through torsion shaft 190 there will be a torsional deformation in torsion shaft 190 proportional to the torque being generated by the motor.

Cage bars 178 of output member 170 cause it to rotate with sun gear hub 203. Therefore, rotation of the sun gear hub 203 with respect to the motor shaft 168 upon free movement of sun gear hub 203 with respect to cross member 194 or upon torsional deformation of torsion shaft 190 causes output member 170 to rotate with respect to the motor shaft 168. The threads 172 of output member 170 mesh with spiral grooves 176 on the motor shaft 168 thereby converting relative angular displacement of sun gear hub 203 to linear axial displacement of the output member 170 of motion converter 162 proportional to the torsional deformation of torsion shaft 190. The axial position of output member 170 is sensed by linear displacement sensor 164. The linear displacement sensor 164 of the lost motion transducer 34 may be of the same construction and operating principle as described with reference to the torque transducer 32.

Sun gear 202 is retained on sun gear hub 203 by retaining collar 206 which resides in groove 209 of sun gear hub 203 and groove 207 of sun gear 202. Retaining collar 206 in addition to fixing the axial position of sun gear 202 also provides a rotationally yielding connection between sun gear hub 203 and sun gear 202. In normal operation retaining collar 206 presses on both the bottom 208 of groove 207 and the bottom 210 of groove 209 so that rotation of hub 203 causes rotation of collar 206 because of the friction therebetween and rotation of retaining collar 206 causes rotation of sun gear 202 because of the friction therebetween. However, in the event of excessive torque such as might result from impact to a front wheel of the vehicle there is slippage at one of the sets of points of frictional contact with retaining collar 206 and the sun gear 202 will rotate on hub 203 thus protecting the motor, torsion bar and gear train from excessive strain. Because the bottom 208 of groove 207 is smooth and the bottom 210 of groove 209 is not smooth it may be advantageous to include the retaining lips 211 on retaining collar 206 which prevent rotation of the retaining collar 206 with respect to the sun gear hub 203 thereby requiring slippage to be only between retaining collar 206 and sun gear 202.

The construction of the overall power steering unit 10 will now be described with reference to FIGS. 2 through 5. The unit 10 comprises an upper housing member 192 and a lower housing member 194 which are bolted together to form a sealed unit. The upper steering shaft 14 extends through the upper housing member 192 and is connected near its lower end with the input member 56 of the torque transducer 32. The upper shaft 14 is connected with the central actuator 138 of the torque transmitting coupling 26, as described above. The coupling block 92 of the coupling 26 is connected through the shaft 22 with the steering gear 16. The stepping motor 28 is mounted on the upper housing 192 and the shaft 168 thereof is an input member of the lost motion transducer 34. The other input member 172 of the transducer 34 is connected to the hub 203 of sun gear 202 of planetary gear set 35. The motor shaft 168 is connected to the sun gear 202 through the lost motion torque transmitting coupling 30. The planetary gear set 35 comprises sun gear 202 and planetary gears 204 rotatably mounted on a circular plate 206 of a planetary carrier 208. They mesh with a ring gear 252 which is fixedly mounted in the upper housing member 192. The planetary carrier 208 includes a hollow shaft 212 which is rotatably mounted on a shaft 214 secured to the lower housing member 194 and extending through the hollow shaft 212. The hollow shaft 212 carries a pinion gear 216 which meshes with the ring gear 96 of the torque transmitting coupling 26. The linear displacement sensor 54 of the torque transducer 32 is electrically coupled through an electrical connector 218 to the signal processing circuit 31 previously described with reference to FIG. 7. Similarly, the linear displacement sensor 164 of the transducer 34 is coupled through a connector 222 to the signal processing circuit 33 previously described with reference to FIG. 7.

Figure 2:
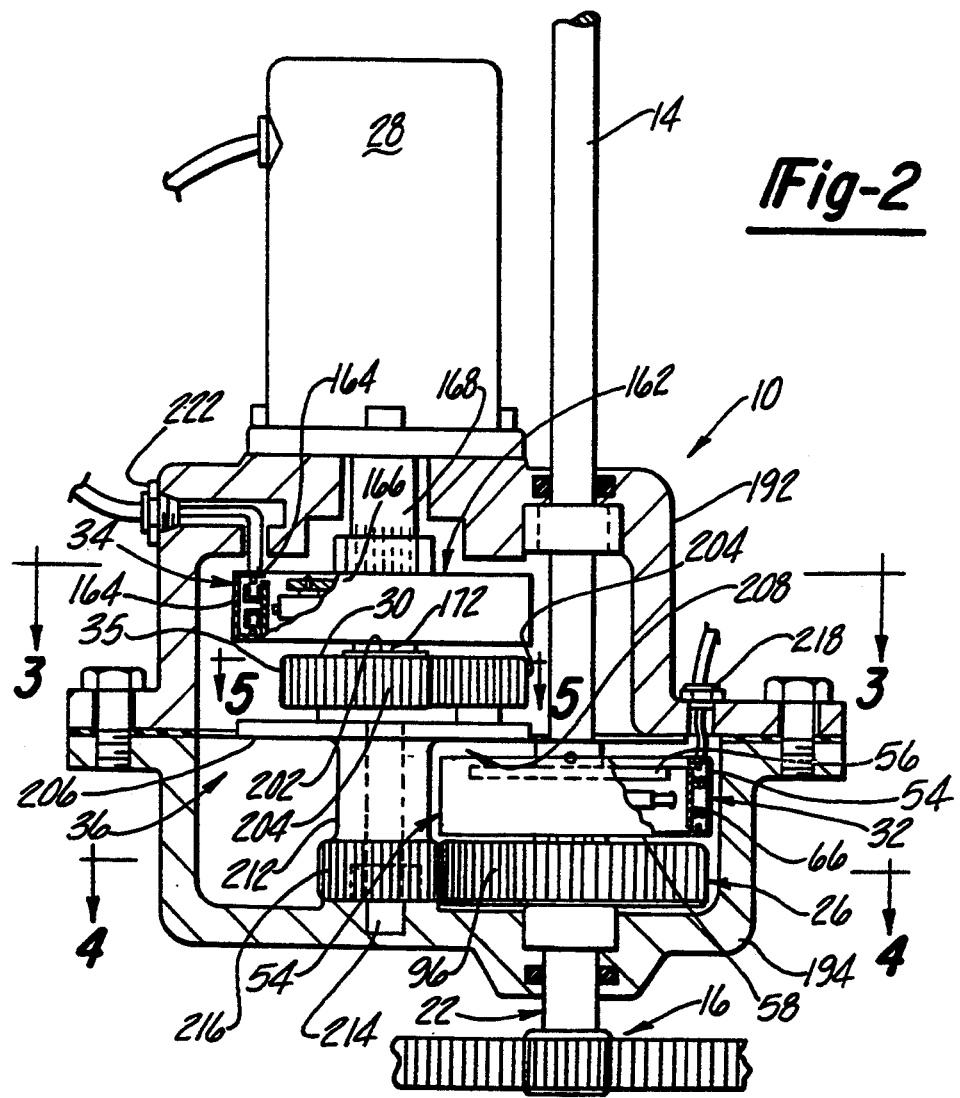
FIG. 2 is a view, partially in section, of the power steering unit of FIG. 1.
Figure 8:
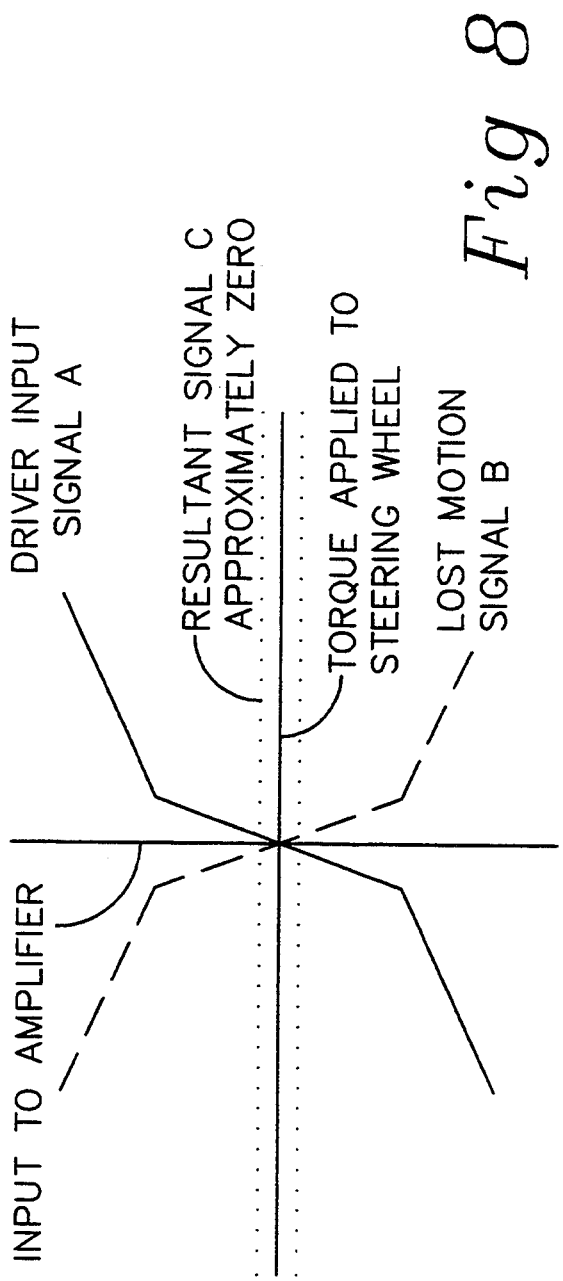
FIG. 8 is a diagram to aid explanation.

The operation of the power steering unit 10 will now be described with particular reference to FIGS. 2, 7 and 8. When the driver turns the steering wheel 12 in a clockwise direction for a right-hand turn, the torque transducer 32 develops a signal which is applied to the signal processing circuit 31 and thence through resistors 37 and 39 to the input of the stepping motor control circuit 42. If the signal at the main input of stepping motor control circuit 42 is greater than a predetermined value the stepping motor control circuit 42 energizes the stepping motor to rotate one step with a resulting relative rotation between the motor shaft 168 and the sun gear 202 which will either take up some of the lost motion between cross member 194 and sun gear hub 203 or will torsionally stress torsion shaft 190 with a resulting application of torque. In either case there will be a change in the output of lost motion transducer 34 which will be processed by signal processing circuit 33 and combined differentially through resistors 37' and 39' with the output of signal processing circuit 31 after attenuation by resistors 37 and 39 and applied to the main input of the stepping motor control circuit 42. If the signal at the main input of stepping motor control circuit 42 continues to be greater than the predetermined value the stepping motor control circuit 42 will again energize the stepping motor to rotate one step with a resulting relative rotation between the motor shaft 168 and the sun gear 202 which will again either take up some of the lost motion between cross member 194 and sun gear hub 203 or will torsionally stress torsion shaft 190 with a resulting change in applied torque. This process will repeat until sufficient stepping motor steps occur to bring the differential signal at the main input of stepping motor control circuit below the predetermined limit at which it commands the stepping motor to rotate one step. When sufficient torque is applied by the driver so that sufficient torque can be produced by the stepping motor before bringing the differential signal at the main input of the stepping motor control circuit 42 below the predetermined limit at which it commands the stepping motor to rotate one step, the sun gear 202 is driven synchronously with the motor shaft 168 which drived the planetary gear system 35 to turn the pinion gear 216 which drives the ring gear 96 of the drive transmitting coupling 26. Consequently, the shaft 22 drives the steering gear in synchronism with the rotation of the upper shaft 14 to execute the right-hand turn. The operation just described is obtained when the driver applies a normal turning effort to the steering wheel in turning a corner, for example. In such a usual turn, the signals from the two transducers are substantial so that the stepping motor is controlled by their difference to provide the power assist desired for turning. This is accomplished by the stepping motor control circuit 42 which drives the stepping motor to execute steps in one direction of rotation whenever the combined signal at its main input is greater than zero by a predetermined amount and drives the stepping motor to execute steps in the opposite direction whenever its input is less than zero by the same predetermined amount. (There is a special case of turning with very small amount of turning effort on the steering wheel in which a very low level torque signal is developed; this special case will be discussed subsequently).

When the right-hand turn has been executed, as described above, the driver will normally release the steering wheel. As described previously, the roadway forces acting on the dirigible wheels of the vehicle tend to return them to the straight ahead position. This turning effort in the dirigible wheels is transmitted through the steering linkage to the steering gear 16 and thence through the drive transmitting coupling 26, gear set 36 and the lost motion coupling 30 to the stepping motor 28 tending to return it to the straight ahead position. In this condition, i.e. upon release of the steering wheel by the driver, the torque signal produced by the torque transducer 32 is zero; however, the signal produced by the lost motion transducer 34 is not zero since torque was being applied by stepping motor 28 in executing the right-hand turn. Thus, the lost motion signal alone, which is opposite in sign to the input for the right-hand turn, is applied to the stepping motor control circuit 42. If the input to the stepping motor control circuit 42 resulting from the lost motion signal exceeds the predetermined input level the stepping motor control circuit 42 commands the stepping motor to rotate in the direction opposite the direction that which causes a right hand turn. As the wheels move toward the straight ahead position, the motion will cause the sun gear 202 to rotate; the lost motion transducer 34 will continue to produce a signal that causes rotation of the stepping motor 26 in the direction toward the straight ahead position. Thus, the stepping motor is driven so that it follows the rotation of the sun gear 202 with reduced resistance to the return of the wheels to the straight ahead position. It will now be understood that the operation of the power steering unit 10 for a left-hand turn is analogous to that just described for the right-hand turn.

A special case of turning in which a very small or low level driver torque is applied to the steering wheel was alluted to above. This special case will now be described. Where the torque transducer 32 and its signal processing circuit 31 have an output level similar to that of the lost motion transducer 34 and its processing circuit 33, there is a dead zone which results in the absence of power assist when the driver applies a low level torque to the steering wheel. The low level torque on the steering wheel causes the torque transducer 32 to produce a relatively small signal which, through the stepping motor control circuit 42, energizes the stepping motor 28 to rotate through one or more steps. Assume that in this initial condition, the lost motion coupling 30 is in a centered position and the lost motion signal from the transducer 34 is zero. As the shaft of stepping motor control circuit 42 rotates, the lost motion in the lost motion coupling 30 is taken up and the lost motion signal increases in amplitude. As the limit of unresisted free motion of the lost motion coupling is approached, the lost motion signal counteracts the torque signal and, as a result, the stepping motor stops turning before it reaches the limit of the unresisted free motion of the lost motion the coupling and thus before it can provide power assist for turning the dirigible wheels. Thus, there is a range of small driver input torques on the steering wheel which cause the servomotor 28 to rotate within the limits of unresisted free motion in the lost motion coupling 30 without reaching the point at which positive drive is provided through the coupling. In certain applications, such a dead zone is not objectionable. If desired, power assist will be obtained if the driver merely increases the torque applied to the steering wheel.

In the event that it is desired to diminish the dead zone described above, it may be done in the following manner. The torque transducer 32 and its associated signal processing circuit may be provided with high enough gain in the vicinity of zero torque so that the torque signal will predominate over the lost motion signal for almost all levels of torque applied to the steering wheel providing the lost motion coupling 30 is within its range of unresisted free movement. This relationship is illustrated in FIG. 8 wherein the input signals to the stepping motor control circuit 42 are plotted as a function of the torque applied to the steering wheel. In the graph, the driver input signal A has a steep slope or high gain in the vicinity of zero torque and then changes to a lesser slope at predetermined points. The graph shows the corresponding lost motion signal B from the lost motion transducer 34 and associated signal processing circuit 33. With this relationship of signals, the power steering unit operates with a much smaller dead zone, shown as the horizontal portion of resultant signal C and power assist is provided at almost all levels of torque applied to the steering wheel by the driver.

It may be desirable to reduce the unresisted lost motion in the lost motion transducer 34. This may be accomplished by connecting the output of signal processing circuit 31 directly into a second input of stepping motor control circuit 42 as shown in FIG. 7. Stepping motor control circuit 42 is designed to reduce its predetermined upper and lower limits when the signal at the second input is approximately zero. In this configuration smaller input from the lost motion transducer 34 is sufficient to cause stepping of the stepping motor 26 when the driver input torque is approximately zero and the unresisted lost motion in the lost motion transducer 34 can be correspondingly reduced.

Although this invention has been described with reference to a particular embodiment, it is not to be construed in a limiting sense. Many variations and modifications will now occur to those skilled in the art. For a definition of the invention reference is made to the appended claims.

What is claimed is:

1. In a vehicle power steering system of the type comprising a manual input means, a motor, a steering gear, means for generating a torque signal related to the torque transmitted by said manual input means, and control means adapted to control the energization of said motor in accordance with said torque signal, the improvement wherein:
    said motor is a stepping motor having an output shaft,
    lost motion means allowing lost motion between said output shaft and said steering gear,
    sensing means for generating a lost motion signal indicative of said lost motion,
    and control means for controlling said stepping motor to step when said torque signal is zero and said lost motion signal exceeds predetermined limits.

2. The invention as defined in claim 1 wherein said control means comprises:
    a stepping motor control circuit,
    means for differentially combining said torque signal with said lost motion signal for developing a resultant signal,
    and means for applying said resultant signal to said stepping motor control circuit for controlling said stepping motor.

3. The invention as defined in claim 2 wherein said stepping motor control circuit is adapted to cause rotation of said stepping motor whenever said resultant signal exceeds predetermined limits.

4. The invention as defined in claim 3 wherein said predetermined limits are separated by a range which is narrowed when said torque signal is small.

5. The invention as defined in claim 1 wherein said lost motion means is adapted to provide unresisted lost motion in a range of lost motion about a central position.

6. The invention as defined in claim 1 wherein said lost motion means allows unresisted lost motion over a range of said lost motion and including a resilient element adapted to resiliently resist lost motion beyond said range of unresisted lost motion.

7. The invention as defined in claim 1 wherein said sensing means comprises:
    a motion converter for converting said lost motion to linear displacement of an output member and,
    and sensor responsive to said linear displacement for generating said lost motion signal.

8. The invention as defined in claim 7 wherein said motion converter comprises:
    a first input member connected for rotation with said output shaft,
    a second input member connected for rotation with said steering gear,
    first threads connected for rotation with one of said input members,
    said output member having second threads engaging said first threads,
    and means constraining said second threads to rotate with the other of said input members.

9. In a vehicle power steering system of the type comprising a manual input means, an electric motor, a steering gear, means for generating a torque signal related to the torque transmitted by said manual input means, and control means adapted to control the energization of said motor in accordance with the torque signal, the improvement wherein:
    said motor is an electric stepping motor having an output shaft,
    lost motion means allowing lost motion between said output shaft and said steering gear,
    angular displacement sensing means for generating a lost motion signal indicative of lost motion in said lost motion means,
    and control means responsive to said lost motion signal for energizing said stepping motor to reduce its resistance to the turning of the dirigible wheels toward the straight ahead direction when said torque signal is zero, said control means comprising:
    a stepping motor control circuit,
    means for combining said torque signal with said lost motion signal for developing a resultant signal,
    and means for applying said resultant signal to said stepping motor control circuit for controlling said stepping motor.

10. The invention as defined in claim 9 wherein said stepping motor control circuit is adapted to cause rotation of said stepping motor whenever said resultant signal exceeds predetermined limits.

11. The invention as defined in claim 10 wherein said predetermined limits are separated by a range which is narrowed when said torque signal is small.

12. The invention as defined in claim 9 wherein said lost motion means is adapted to provide unresisted lost motion in a range of lost motion about a central position.

13. In a vehicle power steering system of the type comprising a manual input means, an electric motor, a steering gear, means for generating a torque signal related to the torque transmitted by said manual input means, and control means adapted to control the energization of said motor in accordance with the torque signal, the improvement wherein:

said motor is an electric stepping motor having an output shaft, lost motion means allowing lost motion between said output shaft and said steering gear, angular displacement sensing means for generating a lost motion signal indicative of lost motion in said lost motion means, control means responsive to said lost motion signal for energizing said stepping motor to reduce its resistance to the turning of the dirigible wheels toward the straight ahead direction when said torque signal is zero, and wherein said lost motion means allows unresisted lost motion over a range of said lost motion and includes a resilient element adapted to resiliently resist lost motion beyond said range of unresisted lost motion.

14. In a vehicle power steering system of the type comprising a manual input means, an electric motor, a steering gear, means for generating a torque signal related to the torque transmitted by said manual input means, and control means adapted to control the energization of said motor in accordance with the torque signal, the improvement wherein:

said motor is an electric stepping motor having an output shaft, lost motion means allowing lost motion between said output shaft and said steering gear, angular displacement sensing means for generating a lost motion signal indicative of lost motion in said lost motion means, control means responsive to said lost motion signal for energizing said stepping motor to reduce its resistance to the turning of the dirigible wheels toward the straight ahead direction when said torque signal is zero, and wherein said sensing means comprises:

a lead-screw for converting said lost motion to linear displacement of an output member, and a sensor responsive to said linear displacement for generating said lost motion signal.

15. The invention as defined in claim 14 wherein said motion converter comprises:

a first input member connected for rotation with said output shaft, a second input member connected for rotation with said steering gear, one of said input members having first threads connected for rotation therewith, said output member having second threads engaging said first threads, and means constraining said second threads to rotate with the other of said input members.

* * * * *